(12) United States Patent
Tsuji et al.

(10) Patent No.: US 7,434,488 B2
(45) Date of Patent: Oct. 14, 2008

(54) TRANSMISSION FOR TRACTOR

(75) Inventors: Kenichiro Tsuji, Sakai (JP); Toshimitsu Yazaki, Sakai (JP); Toshinobu Owada, Hannan (JP)

(73) Assignee: Kubota Corporation, Osaka (JP)

( * ) Notice: Subject to any disclaimer, the term of this patent is extended or adjusted under 35 U.S.C. 154(b) by 185 days.

(21) Appl. No.: 11/351,324

(22) Filed: Feb. 9, 2006

(65) Prior Publication Data

US 2006/0243076 A1    Nov. 2, 2006

(30) Foreign Application Priority Data

Feb. 22, 2005    (JP) .............................. 2005-046016

(51) Int. Cl.
*F16H 3/22* (2006.01)
(52) U.S. Cl. .............................. 74/343; 74/329; 74/331; 74/334; 74/336 R; 74/339; 74/352; 74/355; 74/372; 74/606 R
(58) Field of Classification Search ................... 74/325, 74/329, 331, 333, 334, 335, 336 R, 339, 342, 74/343, 352, 355, 372, 606 R
See application file for complete search history.

(56) References Cited

U.S. PATENT DOCUMENTS

| | | | |
|---|---|---|---|
| 4,716,775 A | | 1/1988 | Horii et al. |
| 4,719,812 A | | 1/1988 | Machida et al. |
| 5,465,630 A | * | 11/1995 | Iwamoto ....................... 74/331 |
| 5,570,605 A | * | 11/1996 | Kitagawara et al. ........ 74/15.63 |
| 5,901,606 A | * | 5/1999 | Umemoto et al. .......... 74/15.66 |
| 6,119,552 A | * | 9/2000 | Matsufuji ................. 74/606 R |
| 6,397,693 B1 | * | 6/2002 | Umemoto et al. ............. 74/333 |

FOREIGN PATENT DOCUMENTS

| JP | 8048168 | 2/1996 |
|---|---|---|
| JP | 2001-30781 A | 2/2001 |

* cited by examiner

*Primary Examiner*—David D. Le
(74) *Attorney, Agent, or Firm*—The Webb Law Firm

(57) ABSTRACT

A transmission for a tractor comprises a transmission case having an opening that opens to exterior of the transmission case and a speed change device that is housed in the transmission case. The transmission also includes a cover removably attached to the transmission case for closing the opening of the transmission, a main speed change shift fork supported by the cover and capable of engaging with and moving a main speed change shifter, and a sub speed change shift fork supported by the cover and capable of engaging with and moving a sub speed change shifter. The cover is capable of mounting a creep speed change device having a creep speed position.

11 Claims, 16 Drawing Sheets

TRANSMISSION FOR TRACTOR

BACKGROUND OF THE INVENTION

The present invention relates to transmissions for tractors.

Conventionally, in a tractor, a gear shifting device that shifts drive power from an engine and transmits the drive power to driving wheels is contained in a transmission case constituting a part of the body of the tractor. The gear shifting device includes a main speed change device that shifts drive power from the engine to multiple speeds and a sub speed change device that further shifts the drive power that has been transmitted through the main speed change device. In the main speed change device and the sub speed change device, gear change is performed by sliding a shifter. The shifter is slid by a shift fork, and the shift fork is operated by an operating lever (see JP 2001-30781A).

Conventionally, the main speed change fork or the sub speed change fork is attached to a shift rod that is sidably supported by a support wall provided inside the transmission case, and thus there is a problem in that it is difficult to install the shift fork in the transmission case.

SUMMARY OF THE INVENTION

In view of the foregoing problem, it is an object of the present invention to provide a transmission for a tractor in which a main speed change fork for shifting gears of a main speed change device of a gear shifting device of the tractor and a sub speed change fork for shifting gears of a sub speed change device of the gear shifting device can be installed in the gear shifting device easily.

A transmission for a tractor in accordance with the present invention comprises a transmission case having an opening that opens to exterior of the transmission case and a speed change device that is housed in the transmission case and that transmits driving power from an engine of the tractor to a driven wheel. The speed change device includes a main speed change device capable of changing speed of driving power form the engine to a plurality of speeds, a main speed change shifter that causes the main speed change device to change speed, a sub speed change device that further changes speed of driving power whose speed was changed by the main speed change device and a sub speed change shifter that causes the sub speed change device to change speed. The transmission also includes a cover removably attached to the transmission case for closing the opening of the transmission, a main speed change shift fork supported by the cover and capable of engaging with and moving the main speed change shifter, and a sub speed change shift fork supported by the cover and capable of engaging with and moving the sub speed change shifter. The cover is capable of mounting a creep speed change device having a creep speed position.

Since the main speed change shift fork and the sub speed change shift fork are supported to the cover that covers the opening in the transmission case, the main speed change shift fork and the sub speed change shift fork can be mounted to the transmission by first mounting them on the cover outside the transmission case and then attaching the cover to close the opening. This facilitates the installation of the main speed change shift fork and the sub speed change shift fork. Further, it is possible to attach the creep speed change device to the cover.

DETAILED DESCRIPTION OF PREFERRED EMBODIMENTS

Hereinafter, embodiments of the present invention will be described with reference to the drawings.

Figure 1:
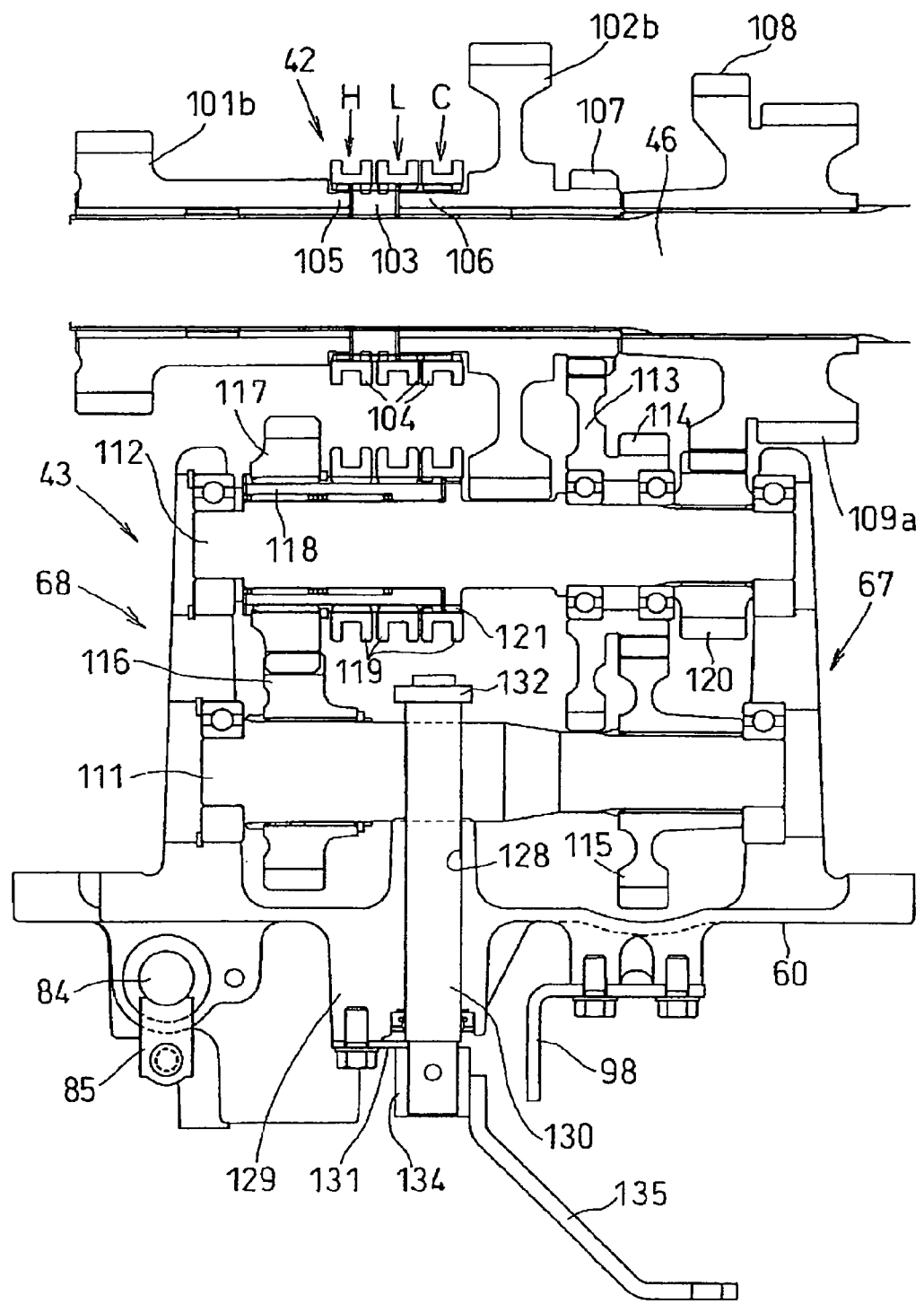
FIG. 1 is a bottom sectional view of a sub speed change device and a creep speed change device.
Figure 2:
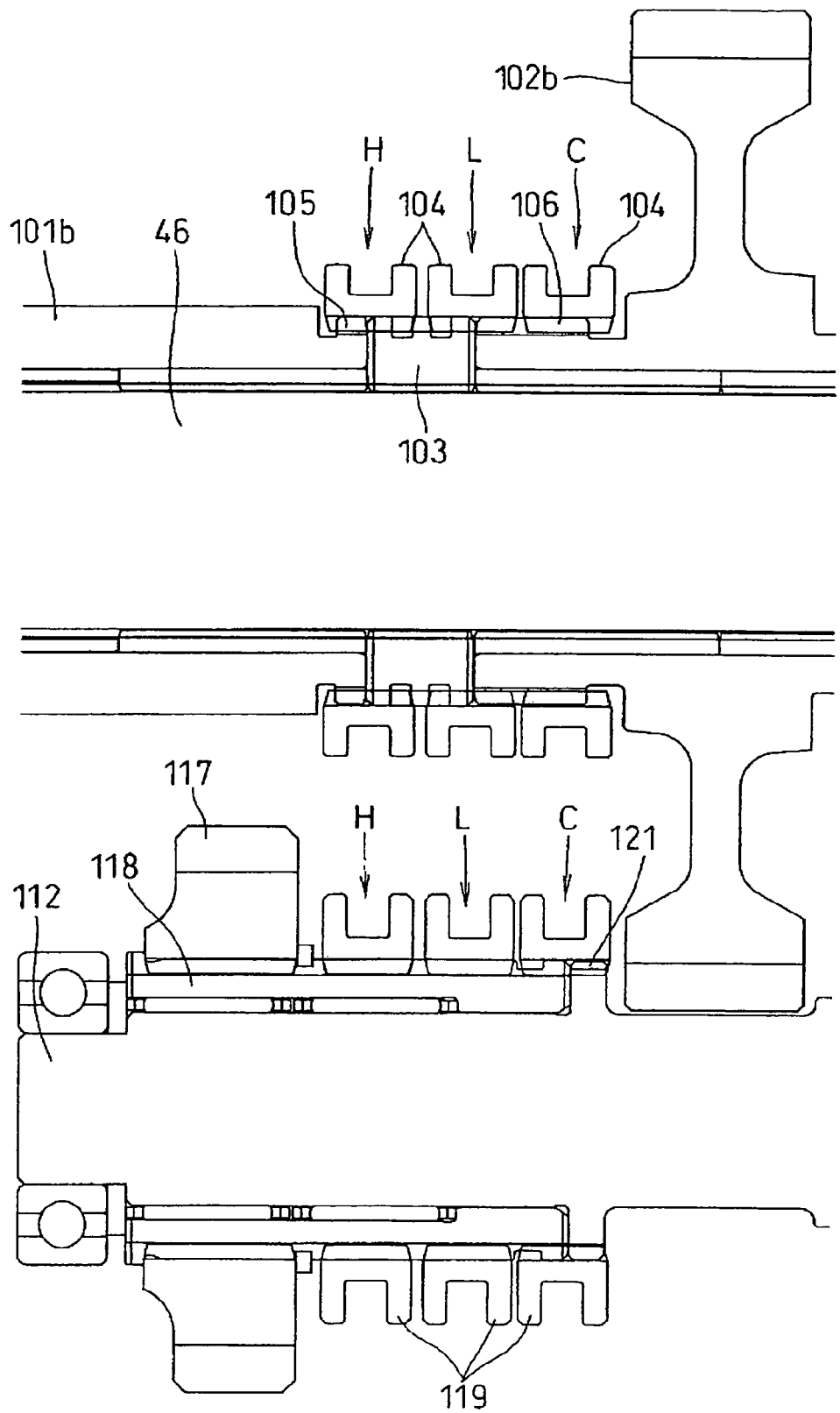
FIG. 2 is a sectional enlarged view of a shift portion of the sub speed change device and the creep speed change device.
Figure 3:
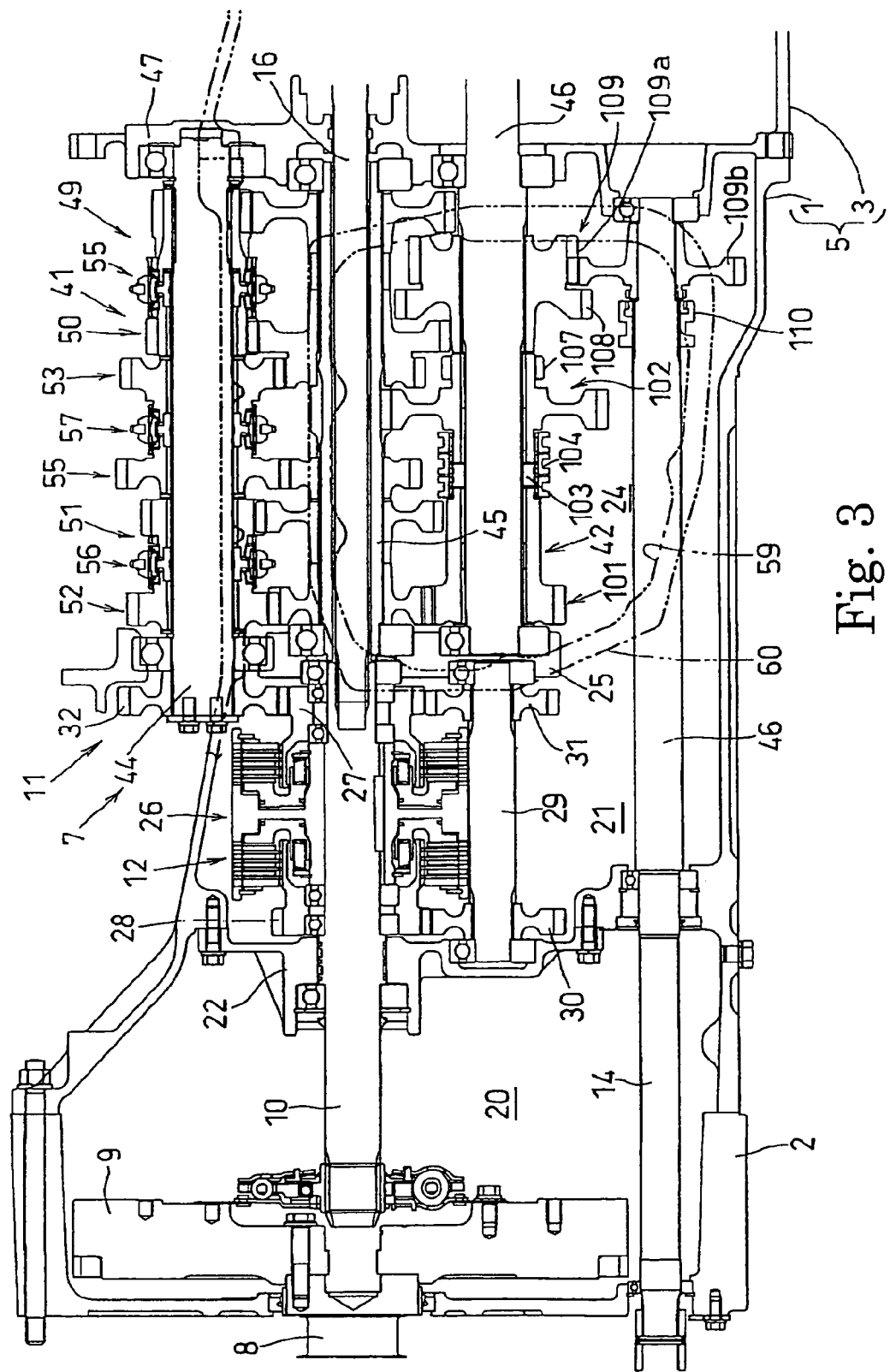
FIG. 3 is a side sectional view of a front portion of the body of a tractor taken from the right side.
Figure 4:
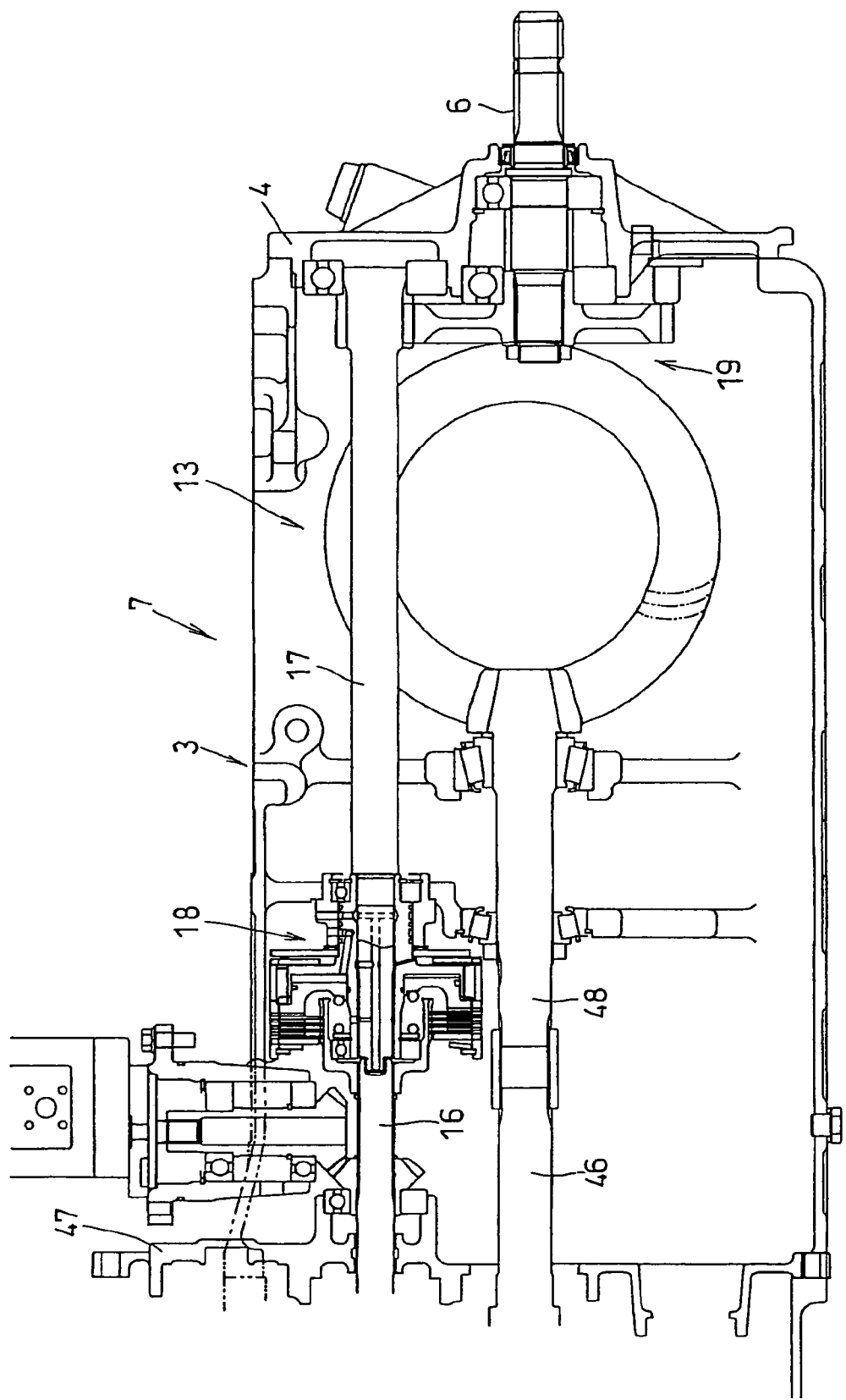
FIG. 4 is a side sectional view of a rear portion of the body of the tractor taken from the right side.

FIG. 3 shows a clutch housing 1, and the clutch housing 1 is connected to the rear end side of a flywheel housing 2 that is connected to the rear end side of an engine. FIG. 4 shows a transmission housing 3 that is connected to the rear end side of the clutch housing 1, and an opening at the rear end side of the transmission housing 3 is closed by a rear cover 4. The clutch housing (front case) 1 and the transmission housing (rear case) 3 form a transmission case 5 constituting a part of the body of a tractor, and the transmission case 5, the engine, and the flywheel housing 2, for example, are the main components of the body of the tractor.

The transmission case 5 accommodates a power train 7 having a running system power train line for transmitting drive power from the engine to driving wheels and a PTO system power train line for transmitting the drive power to a PTO shaft 6. The running system of this power train 7 includes a propeller shaft 10 to which drive power is transmitted from a crankshaft 8 of the engine via a flywheel 9 and the like, a gear shifting device 11 that transmits the drive power from the propeller shaft 10 to the rear wheels and the like while converting the torque of the drive power, a forward/reverse travel switching device (shuttle) 12 for switching forward/reverse travel of the tractor by changing the direction of rotation of the drive power transmitted from the propeller shaft 10 to the gear shifting device 11, a rear wheel differential 13 that transmits the drive power from the gear shifting device 11 to the left and right rear wheels, and a front wheel propeller shaft 14 that transmits the drive power that has been transmitted through the gear shifting device 11 to the front wheels.

The propeller shaft 10 and the front wheel propeller shaft 14 have an axis extending in the fore-and-aft direction. Moreover, the PTO system of the power train 7 includes a PTO drive shaft 16 that is directly and coaxially connected to a rear portion of the propeller shaft 10, a PTO transmission shaft 17 that is coaxially provided at the rear of the PTO drive shaft 16, a PTO clutch 18 that disconnectably transmits the drive power from the PTO drive shaft 16 to the PTO transmission shaft 17, and a reduction gear 19 that shifts the drive power from the PTO transmission shaft 17 to a reduced speed and transmits the drive power to the PTO shaft 6. The front side of the propeller shaft 10 is supported, via a bearing, by a partition wall 22 that divides a first chamber 20 of the clutch housing 1 in which the flywheel 9 is provided and a second chamber 21 of the clutch housing 1 in which the forward/reverse travel switching device 12 is provided from each other, and the rear side of thereof is supported, via a bearing, by a division wall 25 that divides the second chamber 21 and a third chamber 24 of the clutch housing 1 in which the gear shifting device 11 is provided from each other.

Figure 5:
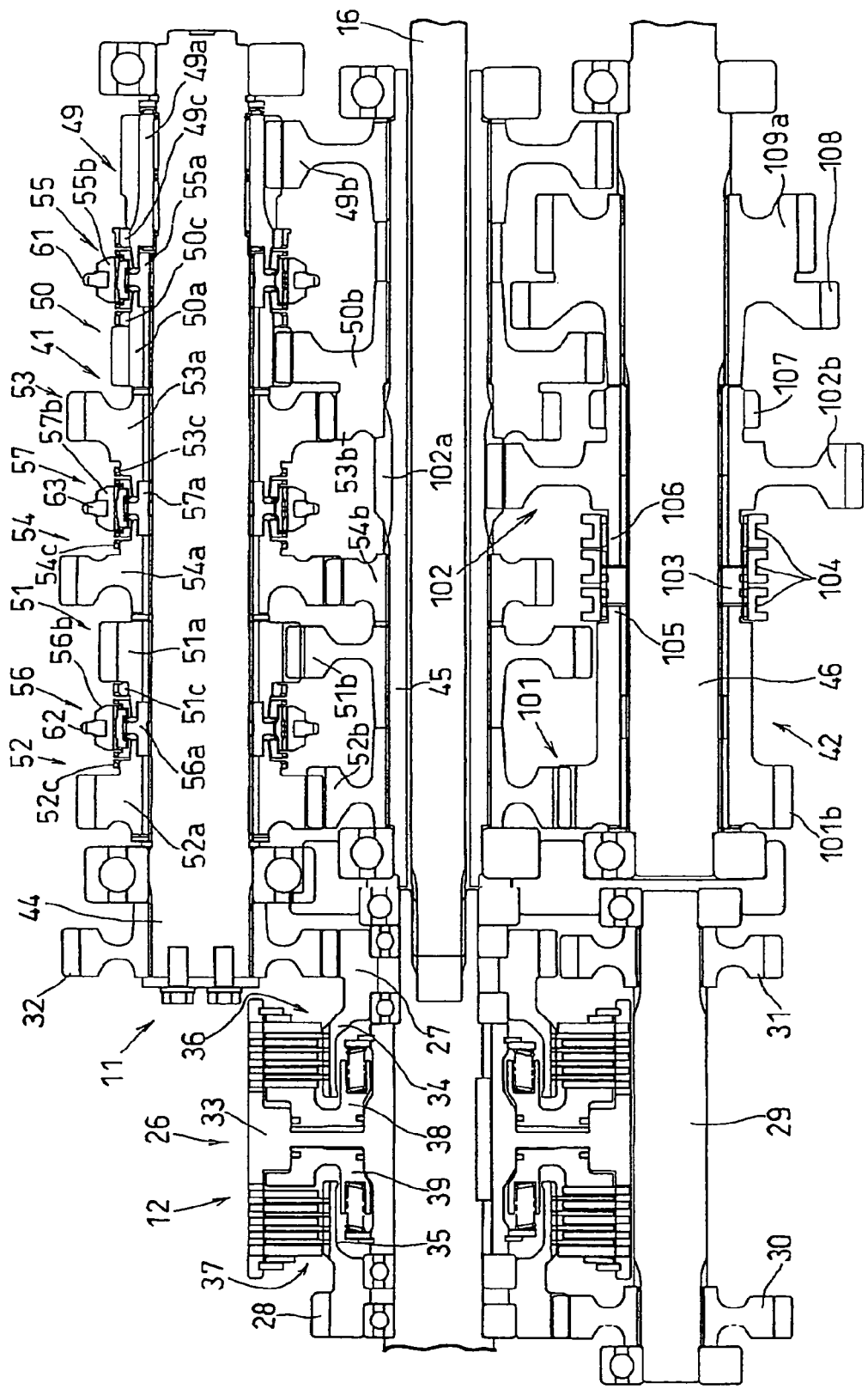
FIG. 5 is a side sectional view of a forward/reverse travel switching device and a gear shifting device.

As also shown in FIG. 5, the forward/backward travel switching device 12 includes a hydraulic clutch 26 that is provided on the propeller shaft 10, a forward travel output gear 27 that is supported on the propeller shaft 10 at the rear of the hydraulic clutch 26 such that it can rotate relative to the propeller shaft 10, a reverse travel output gear 28 that is supported on the propeller shaft 10 in front of the hydraulic clutch 26 such that it can rotate relative to the propeller shaft 10, a reverse travel transmission shaft 29 that is disposed below the propeller shaft 10 and in parallel with the propeller shaft 10 and that is supported between the partition wall 22 and the division wall 25 such that it can freely rotate, a reverse travel first transmission gear 30 that is provided on a front portion of the reverse travel transmission shaft 29 such that it can rotate integrally therewith, and a reverse travel second transmission gear 31 that is provided on a rear portion of the reverse travel transmission shaft 29 such that it can rotate integrally therewith.

The forward travel output gear 27 and the reverse travel second transmission gear 31 mesh with an input gear 32 that inputs drive power to the gear shifting device 11, and the reverse travel first transmission gear 30 meshes with the reverse travel output gear 28. The hydraulic clutch 26 includes a clutch body 33 that is coaxially fixed onto the propeller shaft 10, a rear inner cylinder 34 for forward travel and a front inner cylinder 35 for reverse travel that are coaxially provided on the propeller shaft 10 such that they can rotate relative to the propeller shaft 10, a clutch member 36 for forward travel and a clutch member 37 for reverse travel that are interposed between the clutch body 33 and the inner cylinders 34 and 35, a piston 38 for forward travel and a piston 39 for reverse travel that are provided inside the clutch body 33 such that they can slide in the axis direction.

The forward travel output gear 27 is formed in one piece with the inner cylinder 34 for forward travel, and the reverse travel output gear 28 is formed in one piece with the inner cylinder 35 for reverse travel. The clutch members 36 and 37 for forward travel and reverse travel are of the hydraulic multi-plate type obtained by arranging numerous friction plates to be close to one another, and can be pressed and released by the pistons 38 and 39 for forward travel and reverse travel that are operated by an operating oil from a switching valve, which is omitted in the drawings. In the forward/reverse travel switching device 12 having the foregoing configuration, when the clutch member 36 for forward travel is pressed by operating the piston 38 for forward travel, the inner cylinder 34 for forward travel is directly connected to the clutch body 33, so that the drive power from the propeller shaft 10 is transmitted to the forward travel output gear 27, and then the forward travel drive power is transmitted from the forward travel output gear 27 to the input gear 32, and when the clutch member 37 for reverse travel is pressed by operating the piston 39 for reverse travel, the inner cylinder 35 for reverse travel is directly connected to the clutch body 33, so that the drive power from the propeller shaft 10 is transmitted to the reverse travel second transmission gear 31 via the reverse travel output gear 28→the reverse travel first transmission gear 30→the reverse travel transmission shaft 29, and then the reverse travel drive power is transmitted from the second transmission gear 31 to the input gear 32.

The gear shifting device 11 includes a main speed change device 41 that is capable of shifting the drive power that has been transmitted through the forward/reverse travel switching device 12 to six speeds, i.e., a first speed to a sixth speed, a sub speed change device 42 that is capable of shifting the drive power that has been transmitted through the main speed change device 41 to two speeds, i.e., a high speed and a low speed, a creep speed change device 43 that is capable of shifting the drive power that has been transmitted through the main speed change device 41 to a very low speed (referred to as a creep speed position) that is lower than the low speed of the sub speed change device 42 an input shaft 44 to which the drive power is input from the forward/reverse travel switching device 12, a counter shaft 45 to which the drive power is transmitted from the input shaft 44 via the main speed change device 41, and an output shaft 46 that outputs the drive power shifted by the gear shifting device 11. The input shaft 44 is disposed at the rear of the forward/reverse travel switching device 12 and to the right of the PTO drive shaft 16 so that it is in parallel with the PTO drive shaft 16. A front portion of the input shaft 44 is supported by the division wall 25 via a bearing, and a rear portion thereof is supported by a rear end wall 47 of the clutch housing 1 via a bearing. The front end of the input shaft 44 projects from the division wall 25 toward the front, and the input gear 32 is provided on this portion projecting into the second chamber 21 such that it can rotate integrally with the input shaft 44.

By disposing the input shaft 44 laterally to the propeller shaft 10 and the reverse travel transmission shaft 29 with the front end of the input shaft 44 projecting toward the forward/reverse travel switching device 12 and the input gear 32 provided on that projecting portion, the input gear 32 is allowed to mesh with the forward travel output gear 27 and the reverse travel second transmission gear 31 at the same time. The counter shaft 45 is formed in a cylindrical shape and fitted externally to the PTO drive shaft 16 such that it can rotate relative to the PTO drive shaft 16. The output shaft 46 has an axis extending in the fore-and-aft direction and is disposed directly under the counter shaft 45 at the rear of the reverse travel transmission shaft 29. The output shaft 46 is supported by the division wall 25 and the rear end wall 47 via bearings such that it can freely rotate about the axis, and also inserted into the transmission housing 3, and the rear end side of the output shaft 46 is connected, via a coupling, to a differential drive shaft 48 that transmits the drive power to the rear wheel differential 13.

The main speed change device 41 includes first- to sixth-speed gear trains 49 to 54 for transmitting the drive power from the input shaft 44 to the counter shaft 45 and first to third main gear shifting mechanisms 55 to 57 for switching the drive power transmission route so that the drive power is transmitted via any one of the first- to sixth-speed gear trains 49 to 54. The first- to sixth-speed gear trains 49 to 54 are arranged in the order of the fourth-speed gear train 52, the third-speed gear train 51, the sixth-speed gear train 54, the fifth-speed gear train 53, the second-speed gear train 50, and the first-speed gear train 49 toward the rear, and the first- to sixth-speed gear trains 49 to 54 have input-side gears 49*a* to 54*a* fitted externally to the input shaft 44 such that they can rotate relative to the input shaft 44 and output-side gears 49*b* to 54*b* fitted externally to the counter shaft 45 such that they can rotate integrally with the counter shaft 45.

The first main gear shifting mechanism 55 is provided between the input-side gears 49*a* and 50*a* of the first-speed gear train 49 and the second-speed gear train 50 and performs shifting to the first speed or the second speed, the second main gear shifting mechanism 56 is provided between the input-side gears 51*a* and 52*a* of the third-speed gear train 51 and the fourth-speed gear train 52 and performs shifting to the third speed or the fourth speed, and the third main gear shifting mechanism 57 is provided between the input-side gears 53*a* and 54*a* of the fifth-speed gear train 53 and the sixth-speed gear train 54 and performs shifting to the fifth speed or the sixth speed. The first to third main gear shifting mechanisms 55 to 57 employ a synchromesh system in which the number of rotations of the drive power transmitting side (input shaft 44) and that of the drive power transmitted side (input-side gears of the gear trains of the main speed change device 41) are synchronized with each other to switch the gear trains 49 to 54 (change gears), and the main gear shifting mechanisms 55 to 57 include couplings 55*a* to 57*a* fitted externally to the input shaft 44 such that they can rotate integrally therewith and main speed change shifters (clutch gears) 55*b* to 57*b* fitted externally to the couplings 55*a* to 57*a* such that they can rotate integrally therewith and can move in the axis direction (fore-and-aft direction).

The main speed change shifter 55*b* of the first main gear shifting mechanism 55 is referred to as the "first main speed change shifter 55*b*", the main speed change shifter 56*b* of the second main gear shifting mechanism 56 is referred to as the "second main speed change shifter 56*b*", and the main speed change shifter 57*b* of the third main gear shifting mechanism 57 is referred to as the "third main speed change shifter 57*b*". The input-side gears 49*a* to 54*a* of the first- to sixth-speed gear trains 49 to 54 are provided with respective meshing portions 49*c* to 54*c* that mesh with the first to third main speed change shifters 55*b* to 57*b*. A state in which the meshing portions 49*c* to 54*c* do not mesh with the first to third main speed change shifters 55*b* to 57*b* is a non-power transmission state in which the drive power is not transmitted from the input shaft 44 to the counter shaft 45 via the first- to sixth-speed gear trains 49 to 54, and is used as a neutral position. The first to third main speed change shifters 55*b* to 57*b* are configured such that by sliding any one of them from the neutral position in the axis direction (fore-and-aft direction) so as to allow the shifter to mesh with both any one of the meshing portions 49*c* to 54*c* of the input-side gears 49*a* to 54*a* of the first-to sixth-speed gear trains 49 to 54 and the corresponding coupling 55*a*, 55*b*, or 57*a*, the drive power is transmitted to the counter shaft 45 via the input shaft 44→the couplings 55*a* to 57*a*→the main speed change shifters 55*b* to 57*b*→the meshing portions 49*c* to 54*c*→the input-side gears 49*a* to 54*a*→the output-side gears 49*b* to 54*b*, so that the drive power input to the input shaft 44 is selectively shifted to any one of the first speed to sixth speed of the main speed change device 41 and then transmitted to the counter shaft 45.

Figure 6:
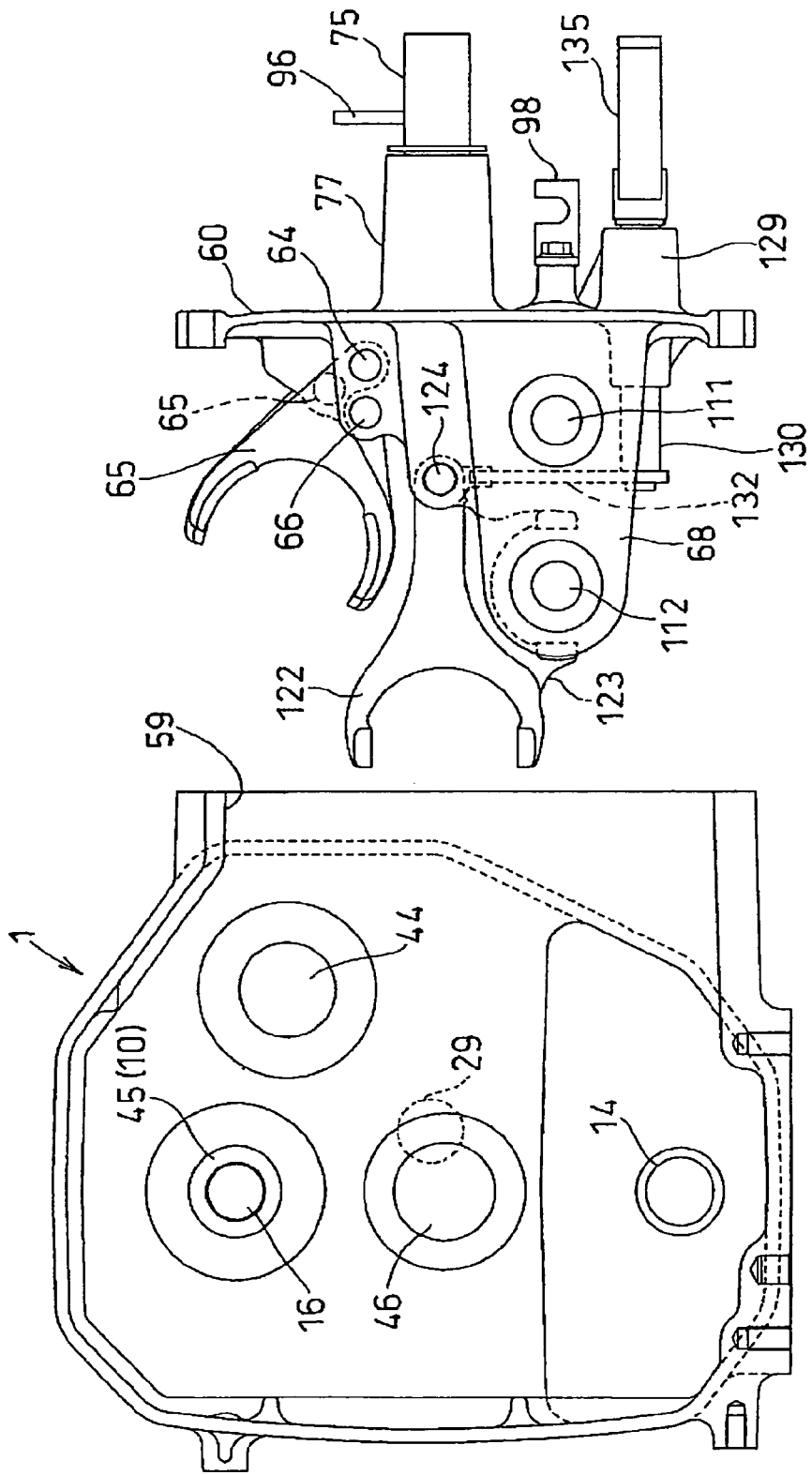
FIG. 6 is a rear sectional view of a clutch housing, a cover, and other components.
Figure 7:
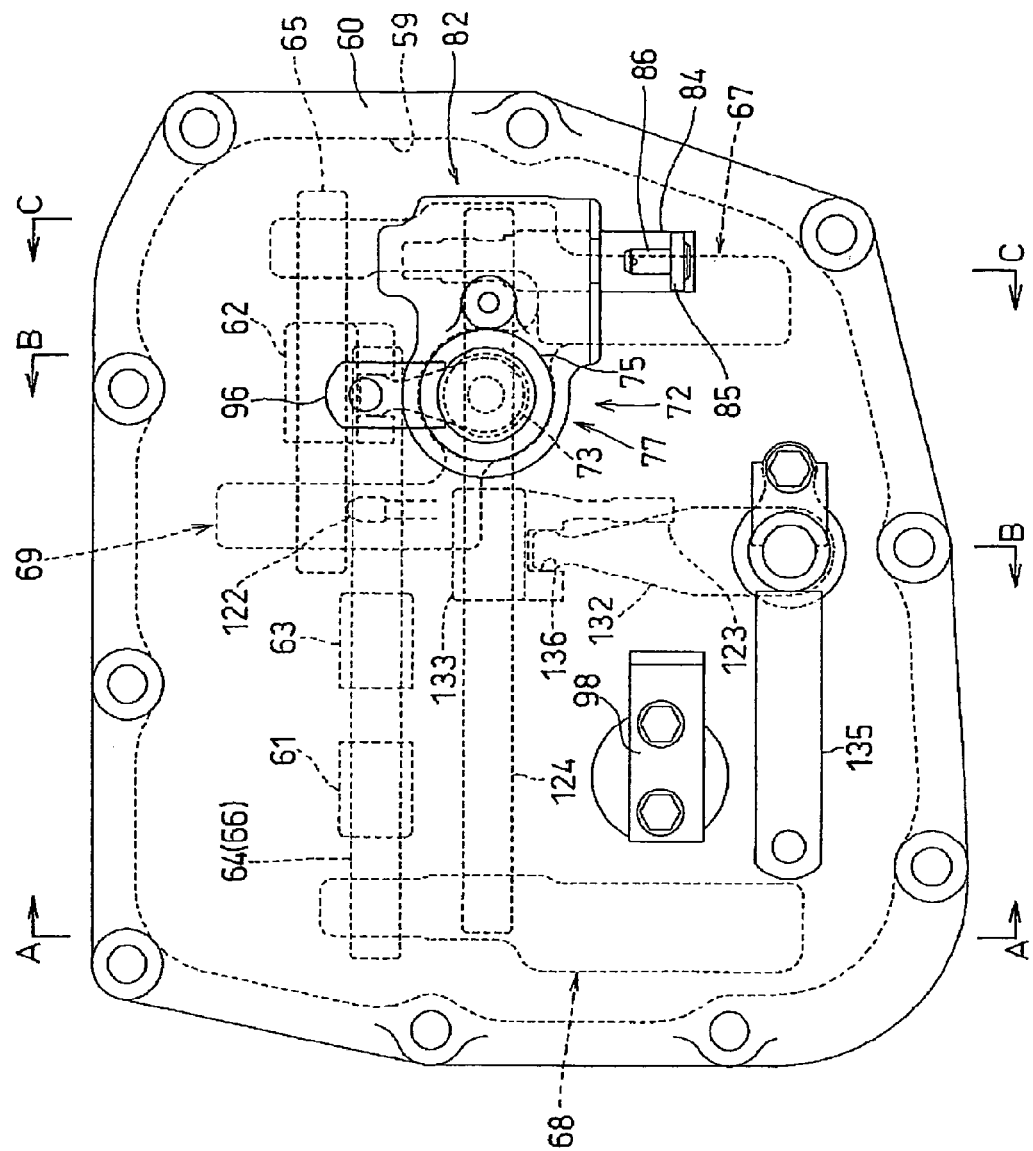
FIG. 7 is a side view of the cover.
Figure 8:
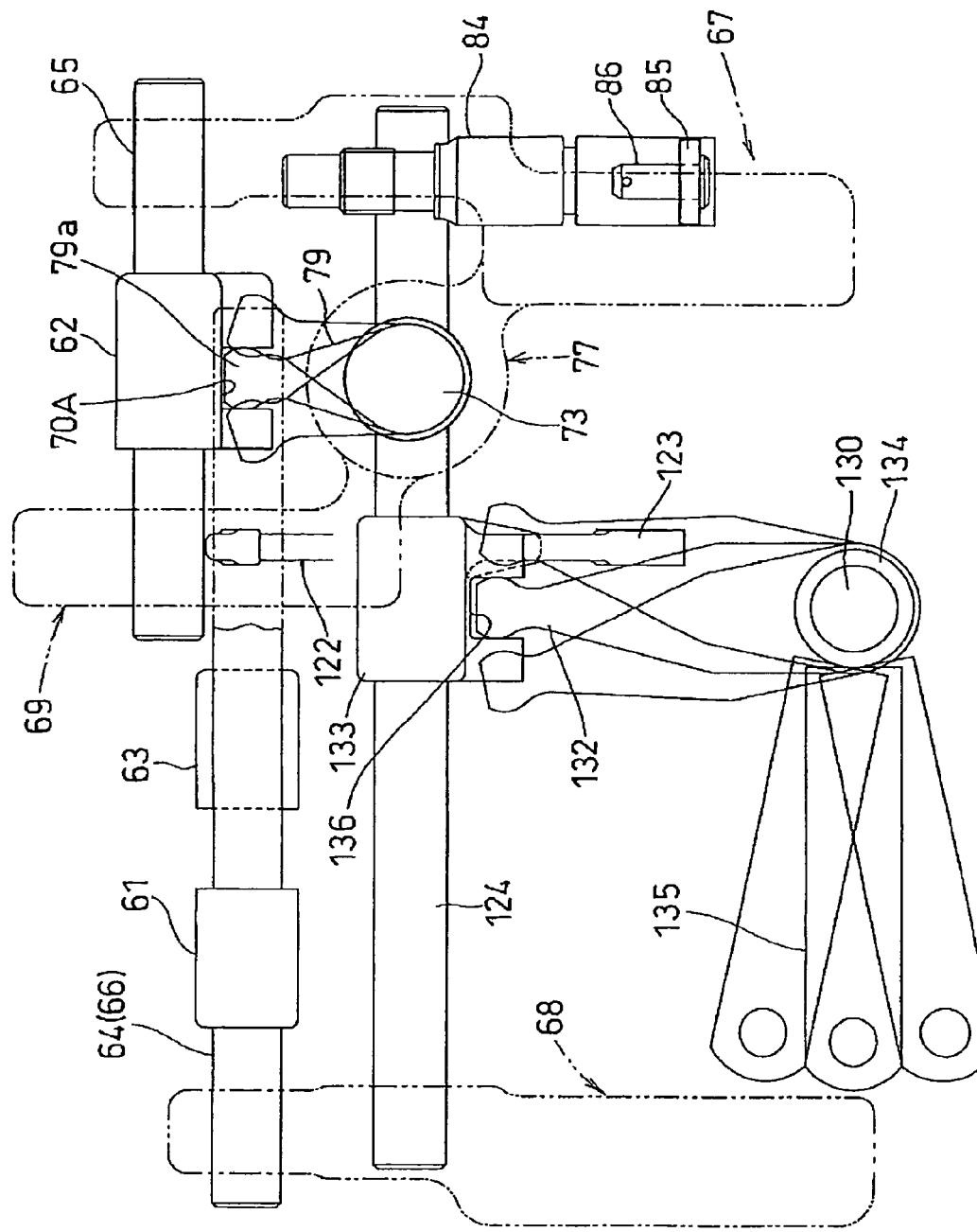
FIG. 8 is a side view of a shift mechanism of a main speed change device, the sub speed change device, and the creep speed change device.
Figure 9:
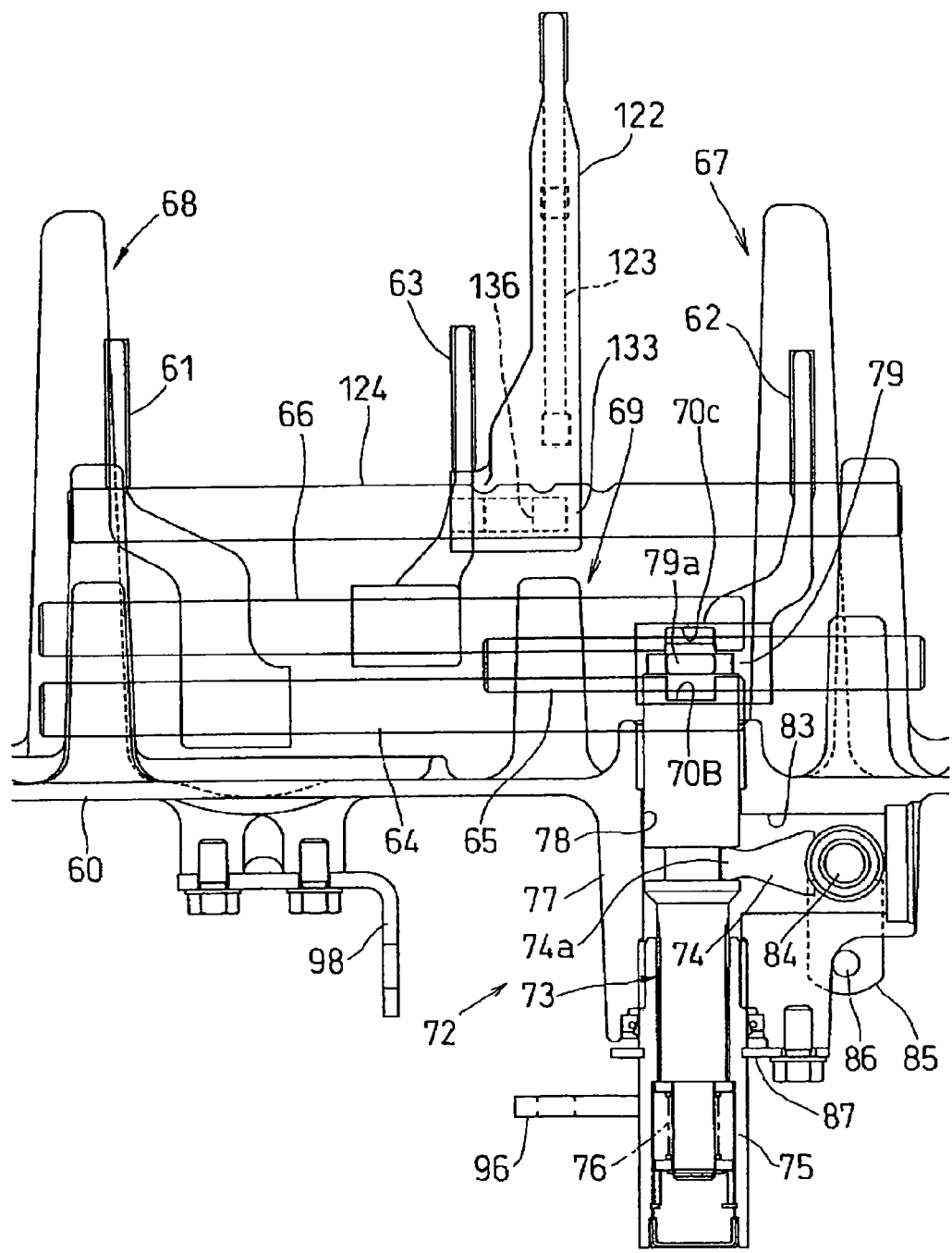
FIG. 9 is a plan view of the shift mechanism of the main speed change device, the sub speed change device, and the creep speed change device.

As shown in FIGS. 3 and 6, an opening 59 is formed in a right side wall of the clutch housing 1, and the opening 59 is closed by a removable cover 60 that is attached to the clutch housing 1. As shown in FIGS. 7 to 13, the cover 60 is provided with first to third main speed change forks 61 to 63 for switching the drive power transmission route by engaging with the first to third main speed change shifters 55*b* to 57*b* and moving the shifters in the axis direction, and the first main speed change fork 61 engages with the first main speed change shifter 55*b*, the second main speed change fork 62 engages with the second main speed change shifter 56*b*, and the third main speed change fork 63 engages with the third main speed change shifter 57*b*.

Moreover, on the cover 60, three shift rods 64 to 66 for supporting the first to third main speed change forks 61 to 63 are provided corresponding to the first to third main speed change forks 61 to 63. On the upper inner surface of the cover 60, a pair of front and rear support walls 67 and 68 and an intermediate support wall 69 that is disposed between the front and rear support walls 67 and 68 are provided. The shift rods 64 to 66 have an axis extending in the fore-and-aft direction. The first shift rod 64 for supporting the first main speed change fork 61 is supported between upper portions of the rear support wall 68 and the intermediate support wall 69 such that it can move in the fore-and-aft direction, the third shift rod 66 for supporting the third main speed change fork 63 is disposed on the inner side in the left-and-right direction of the first shift rod 64 and supported between the rear support wall 68 and the intermediate support wall 69 such that it can move in the fore-and-aft direction, and the second shift rod 65 for supporting the second main speed change fork 62 is disposed above and between the first shift rod 64 and the third shift rod 66 and supported between the front support wall 67 and the intermediate support wall 69 such that it can move in the fore-and-aft direction.

A base portion of the first main speed change fork 61 is fixedly attached to the first shift rod 64, a base portion of the second main speed change fork 62 is fixedly attached to the second shift rod 65, and a base portion of the third main speed change fork 63 is fixedly attached to the third shift rod 66, so that the first to third main speed change forks 61 to 63 are supported by the cover 60 via the first to third shift rods 64 to 66 such that they can move in the fore-and-aft direction. The first and third shift rods 64 and 66 and the base portion of the second main speed change fork 62 have engagement portions 70A to 70C each formed as a groove, for example. The engagement portions 70A to 70C are arranged side-by-side in the left-and-right direction, and the engagement portion (first engagement portion) 70A provided in the base portion of the second main speed change fork 64 is located between the engagement portion (second engagement portion) 70B formed in the first shift rod 64 and the engagement portion (third engagement portion) 70C formed in the third shift rod 66.

Moreover, an operation mechanism 72 that is operatively connected to a main gear shift lever (operating lever) 71 pivotally supported by the body of the tractor and that is used for operating the first to third main speed change forks 61 to 63 is provided on the cover 60. The operation mechanism 72 has an operation shaft 73 for selecting any one of the first to third main speed change forks 61 to 63 and operating the selected shift fork, a selection member 74 for allowing the operation shaft 73 to select any one of the first to third main speed change forks 61 to 63 by engaging with the operation shaft 73 and moving the operation shaft 73 in the axis direction, a rotative member 75 that is attached to the operation shaft 73 such that it can move in the axis direction relative to the operation shaft 73 and can rotate integrally with the operation shaft 73 and that is used for moving the selected main speed change fork 61, 62, or 63 by rotating the operation shaft 73, and a return spring 76 for returning the operation shaft 73 to its reference position.

On the other hand, the cover 60 has a support portion 77 that is formed in one piece therewith so as to project outward in the left-and-right direction. A support hole 78 having an axis extending in the left-and-right direction is formed through the support portion 77, and the operation shaft 73 is inserted into the support hole 78. The operation shaft 73 has a large-diameter portion 73a that is located at the inner end side in the left-and-right direction, a medium-diameter portion 73b that is formed with a smaller diameter than the large-diameter portion 73a and that is located at an intermediate portion in the left-and-right direction, and a small-diameter portion 73c that is formed with a smaller diameter than the medium-diameter portion 73b and that is located at the outer end side in the left-and-right direction. The large-diameter portion 73a is supported by the support hole 78 such that it can move in the axis direction (left-and-right direction). Furthermore, an arm member 79 projecting upward and outward in the radial direction is provided at the inner end side in the left-and-right direction of the large-diameter portion 73a, and an engagement groove 80 is formed along the circumferential direction at the outer end side in the left-and-right direction of the large-diameter portion 73a.

An end (top end, engaged portion) 79a of the arm member 79 engages with the engagement portion 70A of the second main speed change fork 62 when the operation shaft 73 is in the reference position, and is configured such that when the operation shaft 73 is moved from the reference position outward in the left-and-right direction (to a first movement position), the end 79a of the arm member 79 engages with the engagement portion 70B of the first shift rod 64, and when the operation shaft 73 is moved from the reference position inward in the left-and-right direction (to a second movement position), the end 79a of the arm member 79 engages with the engagement portion 70C of the third shift rod 66, so that a configuration is realized in which one of the first to third main speed change forks 61 to 63 is selected by moving the operation shaft 73 in the left-and-right direction.

Then, when the operation shaft 73 is rotated about its axis (about the left-right axis) in the reference position, the first movement position, or the second movement position, the arm member 79 swings backward and forward about the left-right axis, resulting in a backward and forward movement of the selected main speed change fork 61, 62, or 63. At a position in a front part of the support portion 77 and corresponding to the engagement groove 80, a storage portion 82 for storing the selection member 74 is provided. The storage portion 82 is provided with a storage compartment 83 that is formed by blocking the front side of a hole passing through a region forming the storage portion 82 in the fore-and-aft direction and that is in communication with the support hole 78 of the support portion 77, and also provided with a rotative shaft 84 that is disposed to pass through the storage compartment 83 in the up-and-down direction and that is supported such that it can freely rotate about its axis extending in the up-and-down direction.

The selection member 74 is stored in the storage compartment 83. The base end side of the selection member 74 is fixed to the rotative shaft 84 so as to project from the rotative shaft 84 rearward and outward in the radial direction, and also an end 74a of the selection member 74 is inserted into the support hole 78 to engage with the engagement groove 80, so that a configuration is realized in which when the rotative shaft 84 is rotated about its axis, the selection member 74 swings from side to side to move the operation shaft 73 in the left-and-right direction. The lower end side of the rotative shaft 84 projects downward from the storage portion 82. A first lever member 85 is fixed to this downwardly projecting portion such that it projects outward in the radial direction and outward in the left-and-right direction, and a wire connecting pin 86 is provided in the first lever member 85.

The rotative member 75 is formed in a cylindrical shape, and its inner side in the left-and-right direction is inserted into the outer end side in the left-and-right direction of the support hole 78 such that the rotative member 75 can freely rotate about its left-right axis. Also, the inner side in the left-and-right direction of an inner circumferential portion of the rotative member 75 is fitted (spline-fitted) externally to the medium-diameter portion 73b of the operation shaft 73 such that the rotative member 75 can rotate integrally with the operation shaft 73. The rotative member 75 is prevented from being disconnected, by means of a plate 87 fixed to the outer surface of the support portion 77 with a bolt, such that the rotative member 75 can rotate about its axis extending in the left-and-right direction. Moreover, the outer side in the left-and-right direction of the inner circumferential portion of the rotative member 75 is formed with a larger diameter than a spline portion at the inner side and used as an accommodation hole 88, where the inner circumferential portion of the rotative member 75 is formed as a stepped hole, and the small-diameter portion 73c of the operation shaft 73 is projected into the accommodation hole 88.

A pair of left and right ring-shaped spring bearing members 89 and 90 that are arranged facing each other in the left-and-right direction is fitted externally to the small-diameter portion 73c of the operation shaft 73 such that it can move in the left-and-right direction (axis direction of the operation shaft 73) relative to the operation shaft 73, and also the return spring 76 formed of a coiled spring that is provided under compression between these spring bearing members 89 and 90 is fitted externally to the small-diameter portion 73c of the operation shaft 73. The spring bearing member on the outer side in the left-and-right direction (which is referred to as the "outer spring bearing member") 89 is prevented from being disconnected from the small-diameter portion 73c by means of an abutting portion (which is referred to as the "outer abutting portion") 91 formed of a retaining ring fitted into the outer end side in the left-and-right direction of the small-diameter portion 73c.

Moreover, a regulatory portion (which is referred to as the "outer regulatory portion") 92 formed of a cylinder that regulates a movement of the outer spring bearing member 89 to the opposite side is fitted internally to the outer side in the left-and-right direction of the outer spring bearing member 89, and the outer regulatory portion 92 is prevented from being disconnected from the accommodation hole 88 outward in the left-and-right direction by means of an anti-disconnection member 93. Moreover, the inner circumference diameter of the outer regulatory portion 92 is larger than the diameter of the outer abutting portion 91 provided in the small-diameter portion 73c of the operation shaft 73, so that the small-diameter portion 73c and the outer abutting portion 91 can move, in the outer regulatory portion 92, in the left-and-right direction relative to the outer regulatory portion 92.

Figure 10:
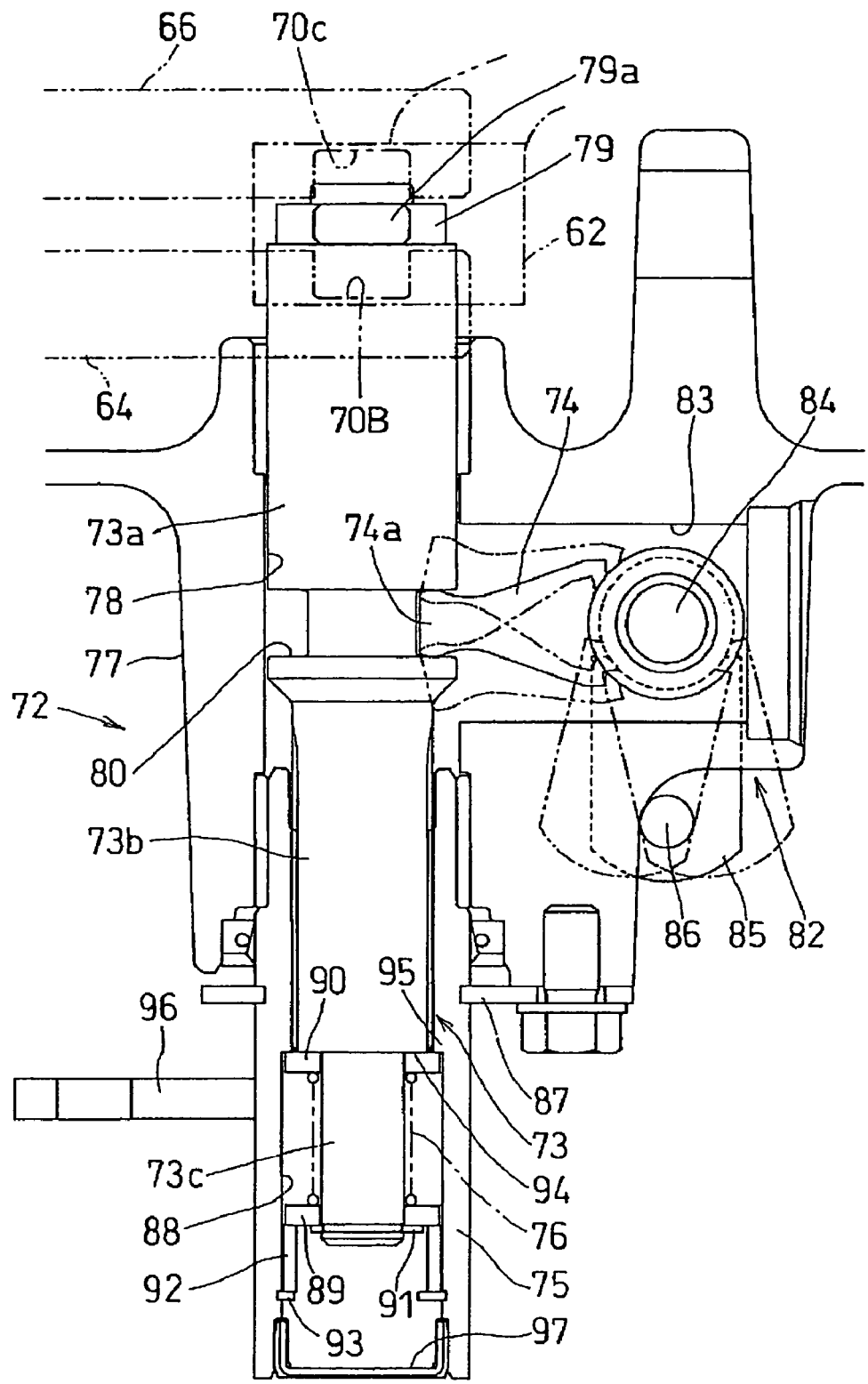
FIG. 10 is a plan sectional view of an operation mechanism of the main speed change device.
Figure 11:
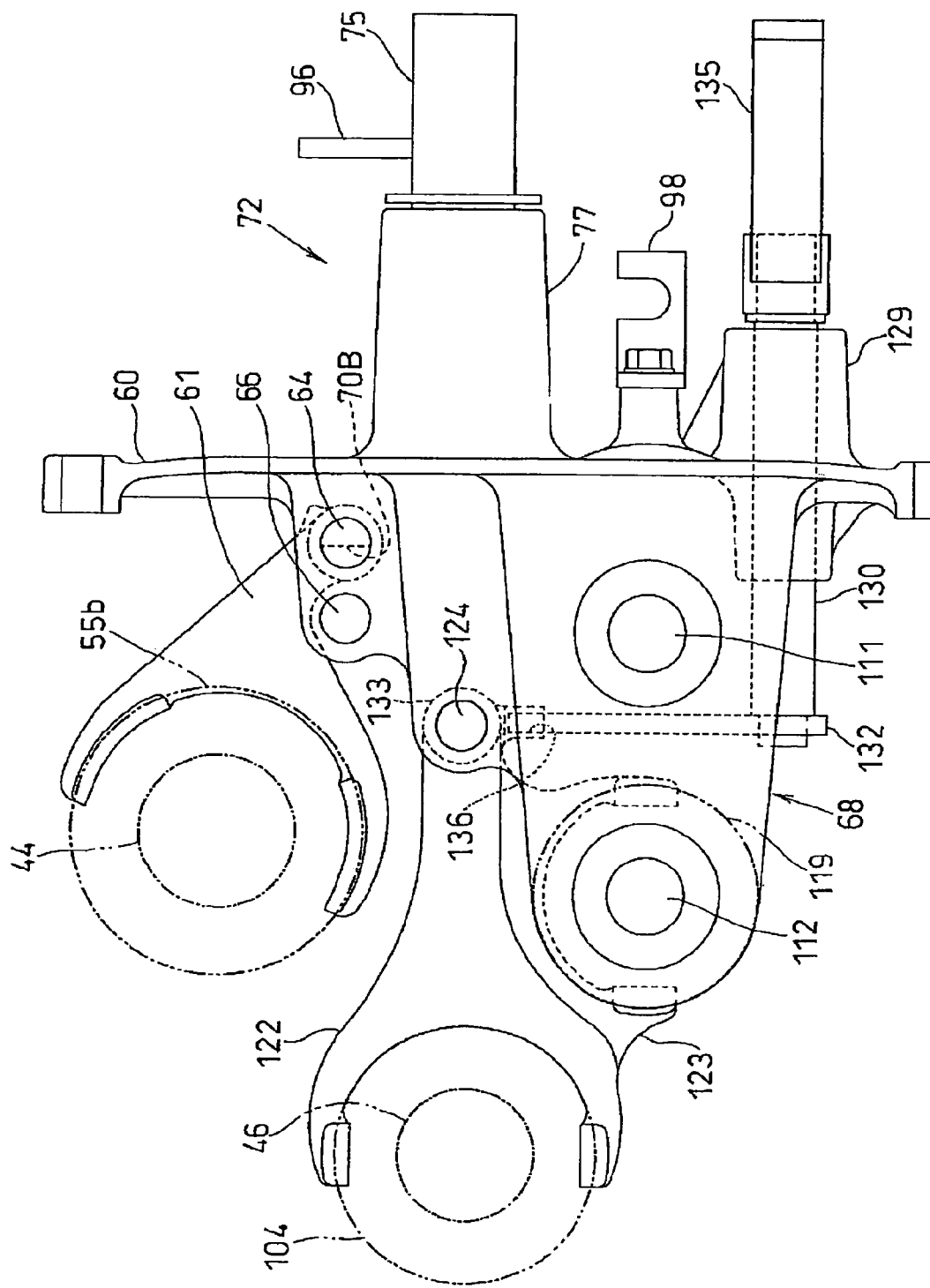
FIG. 11 is a sectional view taken along the line A-A of FIG. 7, when viewed in the direction of the arrows A.
Figure 12:
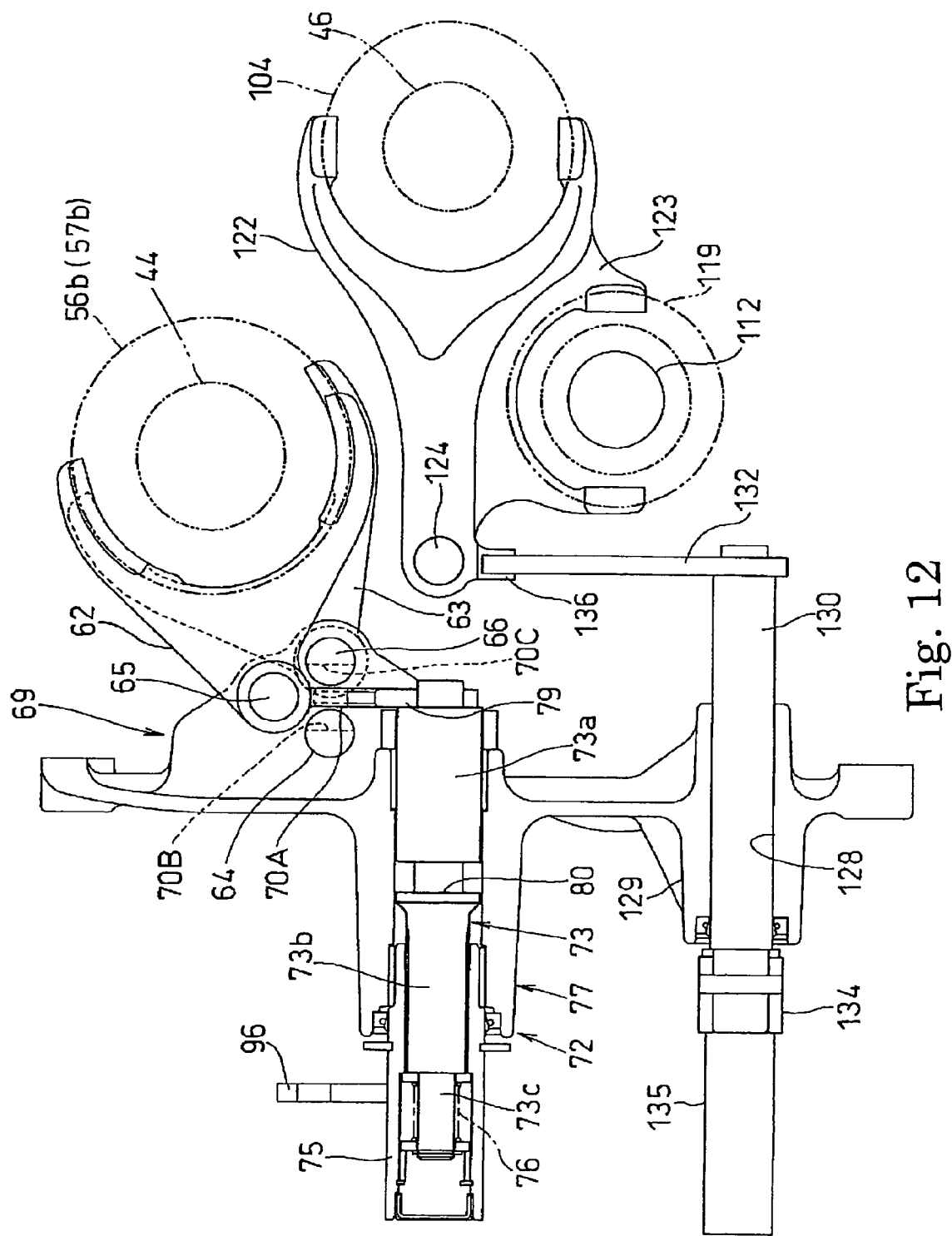
FIG. 12 is a sectional view taken along the line B-B of FIG. 7, when viewed in the direction of the arrows B.
Figure 13:
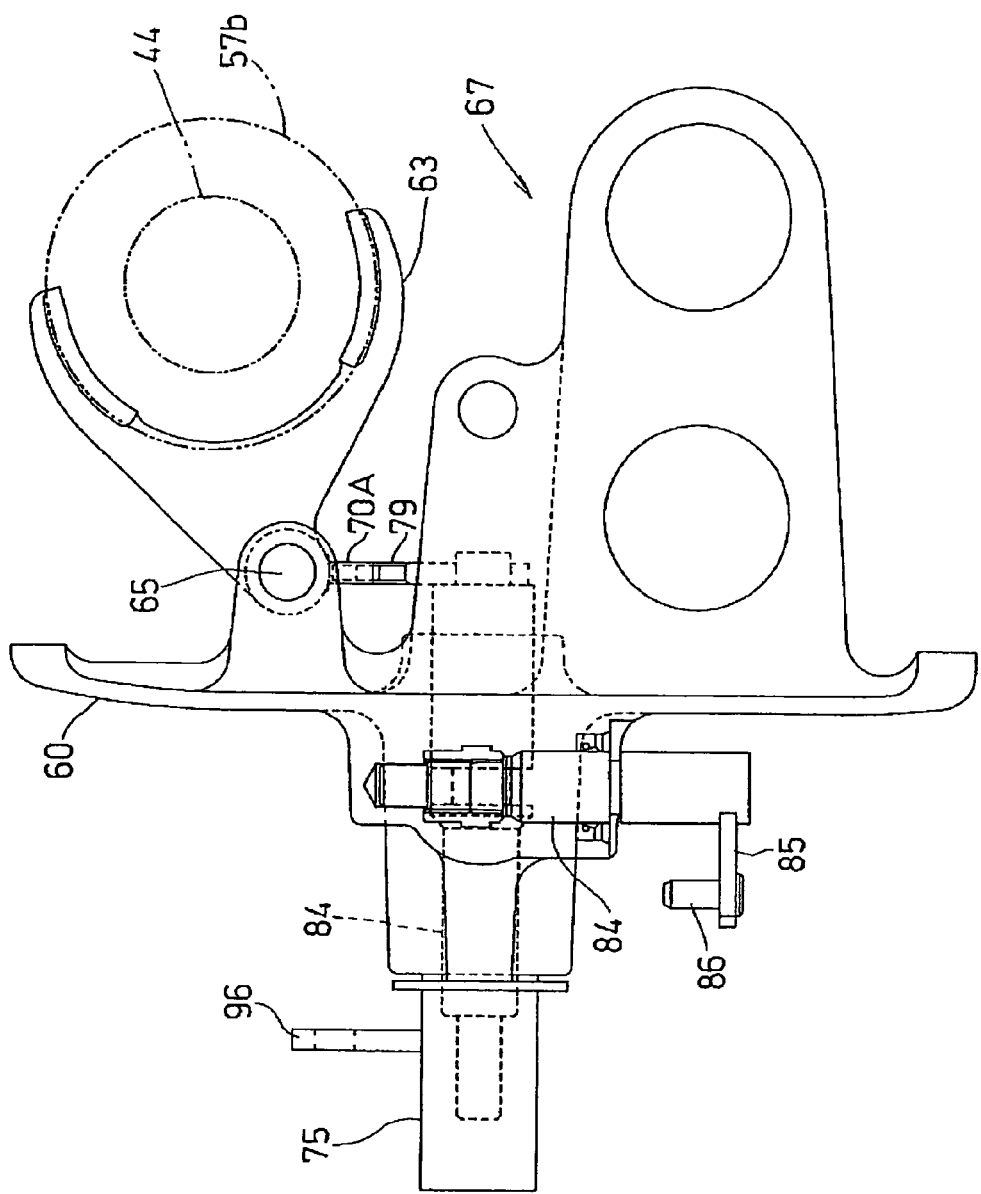
FIG. 13 is a sectional view taken along the line C-C of FIG. 7, when viewed in the direction of the arrows C.

When the operation shaft 73 is in its reference position, as shown in FIG. 10, the outer spring bearing member 89 is biased by the biasing force of the return spring 76 to abut against the outer regulatory portion 92 and the outer abutting portion 91, and the spring bearing member on the inner side in the left-and-right direction (which is referred to as the "inner spring bearing member") 90 is biased by the biasing force of the return spring 76 to abut against an outer end face (this portion is taken as an abutting portion 94 that abuts against the inner spring bearing member 90, and referred to as the "inner abutting portion") in the left-and-right direction of the medium-diameter portion 73b and a step portion (this portion is taken as a regulatory portion 95 that regulates a movement of the inner spring bearing member 80 to the opposite side, and referred to as the "inner regulatory portion") of the inner circumferential portion of the rotative member 75, so that the operation shaft 73 is retained in the reference position by the biasing force of the return spring 76.

When the operation shaft 73 is moved outward in the left-right axis direction from the reference position so as to engage the end 79a of the arm member 79 with the second engagement portion 70B, the inner spring bearing member 90 is pressed by the inner abutting portion 94 to move outward in the left-and-right direction while compressing the return spring 76, thereby allowing the operation shaft 73 to move outward in the left-and-right direction, and when the operating force applied to the operation shaft 73 outwardly in the left-and-right direction is released from this state, the inner spring bearing member 90 is pressed by the biasing force of the return spring 76 to move inward in the left-and-right direction, thereby returning the operation shaft 73 to the reference position. Moreover, when the operation shaft 73 is moved inward in the left-right axis direction from the reference position so as to engage the end 79a of the arm member 79 with the third engagement portion 70C, the outer spring bearing member 89 is pressed by the outer abutting portion 91 to move inward in the left-right axis direction while compressing the return spring 76, thereby allowing the operation shaft 73 to move inward in the left-and-right direction, and when the operating force applied to the operation shaft 73 inwardly in the left-and-right direction is released from this state, the outer spring bearing member 89 is pressed by the biasing force of the return spring 76 to move outward in the left-and-right direction, thereby returning the operation shaft 73 to the reference position.

Therefore, the operation shaft 73, the position of which can be changed between three positions in the left-right axis direction, can be returned to the reference position, i.e., the middle one of the three positions, by the single return spring 76. A second lever member 96 is fixed to the portion projecting from the support portion 77 such that it projects rearward and outward in the radial direction. It should be noted that the outer end side in the left-and-right direction of the accommodation hole 88 is closed by a lid 97. The first lever member 85 is operatively connected to the main gear shift lever 71 by a selection wire constituted by a push-pull wire, for example, and the second lever member 96 is operatively connected to the main gear shift lever 71 via a link mechanism, for example. The main gear shift lever 71 can be operated to pivot in a first direction a and a second direction b that is perpendicular to the first direction a, and is configured such that a pivoting operation in the first direction a causes a movement of the operation shaft 73 in the left-right axis direction via the first lever member 85, the rotative shaft 84, and the selection member 74, and a pivoting operation in the second direction causes a rotation of the operation shaft 73 about the left-right axis via the second lever member 96 and the rotative member 75 (see FIG. 14A).

Figure 14A:
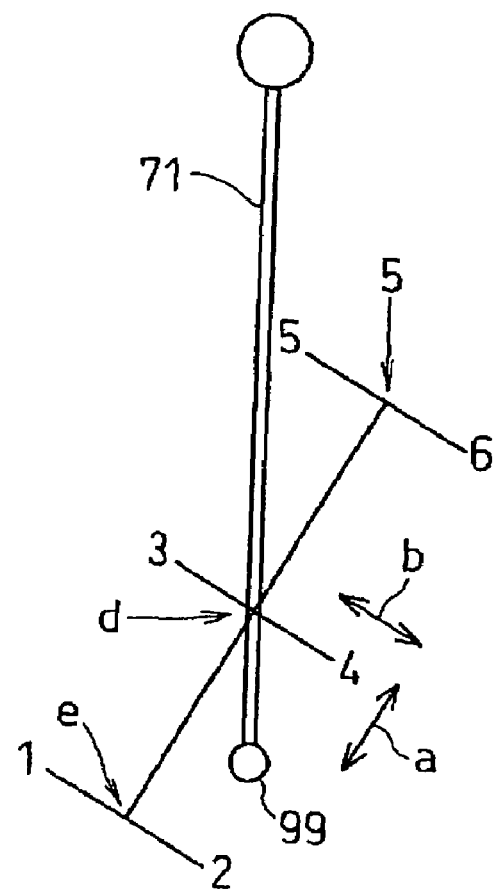
FIG. 14A is a diagram showing a gear shift pattern of the main speed change device.

It should be noted that an attachment member 98 for attaching an outer wire of the selection wire is fixed to the outer surface of the cover 60. An operation pattern of the main gear shift lever 71 is as shown in FIG. 14A. When the main gear shift lever 71 is operated to pivot about a pivot portion 99 in the first direction a, the main gear shift lever 71 can be moved to a first selection position d in which the end 79a of the arm member 79 engages with the first engagement portion 70A, a second selection position e in which the end 79a of the arm member 79 engages with the second engagement portion 70B, and a third selection position f in which the arm member 79 engages with the third engagement portion 70C. The main gear shift lever 71 is returned from the second selection position e or the third selection position f to the first selection position d by the biasing force of the return spring 76. When the main gear shift lever 71 in the first, second, or third selection position d, e, or f is operated to pivot in the second direction b, the main speed change device 41 is shifted to any one of the first speed to the sixth speed.

In the operation mechanism 72 having the foregoing configuration, since the selection member 74 is stored within the storage compartment 83, the portion of the operation shaft 73 that engages with the selection member 74 can be stored within the support hole 78, which results in good sealing properties, and thus leakage of oil can be prevented. As shown in FIG. 5, the sub speed change device 42 has a high-speed gear train 101, a low-speed gear train 102 that is located at the rear of the high-speed gear train 101, a spline boss 103 that is fitted (spline-fitted) externally to the output shaft 46 between the high-speed gear train 101 and the low-speed gear train 102 such that it can rotate integrally with the output shaft 46, and a sub speed change shifter 104 that is fitted (spline-fitted) externally to the spline boss 103 such that it can move in the axis direction and can rotate integrally with the spline boss 103.

An input-side gear of the high-speed gear train 101 is constituted by the output-side gear 52b of the fourth-speed gear train 52 of the main speed change device 41, and an output-side gear 101b is fitted externally to the output shaft 46 such that it can rotate relative to the output shaft 46. Moreover, an input-side gear 102a of the low-speed gear train 102 is formed on and in one piece with the counter shaft 45 between the output-side gears 53b and 54b of the fifth-speed gear train 53 and the sixth-speed gear train 54, and an output-side gear 102b is fitted externally to the output shaft 46 such that it can rotate relative to the output shaft 46. Moreover, meshing portions 105 and 106 that mesh with the sub speed change shifter 104 is provided at the rear side of the output-side gear 101b of the high-speed gear train 101 and the front side of the output-side gear 102b of the low-speed gear train 102, respectively. A state in which the sub speed change shifter 104 does not mesh with the meshing portions 105 and 106 is taken as a non-power transmission state. When the sub speed change shifter 104 is slid forward in the axis direction from this position so that the sub speed change shifter 104 is allowed to mesh with both of the spline boss 103 and the meshing portion 105 of the output-side gear 101b of the high-speed gear train 101, the sub speed change device 42 is turned to a high-speed state in which the drive power is transmitted from the counter shaft 45 to the output shaft 46 via the high-speed gear train 101, the sub speed change shifter 104, and the -spline boss 103, and when the sub speed change shifter 104 is slid backward in the axis direction from the non-power transmission position so that the sub speed change shifter 104 is allowed to mesh with both of the spline boss 103 and the meshing portion 106 of the output-side gear 102b of the low-speed gear train 102, the sub speed change device 42 is turned to a low-speed state in which the drive power is transmitted from the counter shaft 45 to the output shaft 46 via the low-speed gear train 102, the sub speed change shifter 104, and the spline boss 103.

Moreover, the meshing portion 106 of the output-side gear 102b of the low-speed gear train 102 is formed with an axis direction length that is longer than (or almost the same as) that of the sub speed change shifter 104, and thus configured such that the sub speed change shifter 104 can be placed in a position where it does not mesh with the spline boss 103.

When the sub speed change shifter 104 is in this position where it does not mesh with the spline boss 103, the sub speed change device 43 is turned to neither the high-speed state nor the low-speed state, and this position is used as a creep gear shift position C for turning on the creep speed change device 43. Thus, by moving the sub speed change shifter 104 backward (toward one of the axis directions) from a front end side position of its movement range, the position of the sub speed change shifter 104 can be changed between a high-speed position H for turning the sub speed change device 42 to the high-speed state, a low-speed position L for turning the sub speed change device 42 to the low-speed state, and the creep gear shift position C for turning the sub speed change device 42 to neither the high-speed state nor the low-speed state.

The sub speed change shifter 104 can be retained in the high-speed position H, the low-speed position L, and the creep gear shift position C by a detent mechanism. Moreover, the sub speed change shifter 104 also can be retained in a neutral position C between the high-speed position H and the low-speed position L. In a rear portion of the low-speed gear train 102, an output gear 107 that outputs the drive power to the creep speed change device 43 is formed in one piece therewith. An input gear 108 to which the drive power that has been transmitted through the creep speed change device 43 is input is disposed at the rear of the output gear 107, and the input gear 108 is fitted externally to the output shaft 46 such that it can rotate integrally therewith.

At the rear side of the input gear 108, an input-side gear 109a of a front wheel power take-off gear train 109 is formed in one piece therewith, and an output-side gear 109b of the front wheel power take-off gear 109 is fitted externally to the front wheel propeller shaft 14 such that it can rotate relative to the front wheel propeller shaft 14, so that the drive power that has been transmitted through the gear shifting device 11 can be disconnectably transmitted to the front wheels by sliding a clutch 110 provided on the front wheel propeller shaft 14 such that it can slide in the fore-and-aft direction. The creep speed change device 43 is installed on the cover 60, and the creep speed change device 43 can be removably disposed in the power train line between the sub speed change device 42 and the rear wheel differential 13 by attaching the cover 60 to the clutch housing 1, so that a configuration is realized in which the specifications of the gear shifting device 11 can be changed easily between specifications with creep gear shift in which the creep speed change device 43 is installed on the cover 60 and specifications without creep gear shift in which the creep speed change device 43 is not installed on the cover 60. The creep speed change device 43 may be removably mounted or attached to or otherwise supported by the cover 60 by means of any conventional means including a bolt and nut arrangement, spline arrangement, removable pins and boss members each with a hole for receiving the pin.

The creep speed change device 43 is, as shown in FIGS. 1, 2, 7, 8, 11, and 12, provided between lower portions of the front and rear support walls 67 and 68 provided on the inner surface of the cover 60, and includes a pair of left and right transmission shafts 111 and 112 that are supported such that they can freely rotate about an axis extending in the fore-and-aft direction. The transmission shaft 111 on one side (on the outer side in the left-and-right direction) is used as an input-side transmission shaft, while the transmission shaft 112 on the other side (on the inner side in the left-and-right direction) is used as an output-side transmission shaft. Moreover, the creep speed change device 43 includes a first creep gear-shifting gear 113 that is fitted externally to an intermediate portion of the output-side transmission shaft 112 such that it can rotate relative to the output-side transmission shaft 112 and that meshes with the output gear 107, a second creep gear-shifting gear 114 that is formed at the rear side of the first creep gear-shifting gear 113 in one piece therewith, a third creep gear-shifting gear 115 that meshes with the second creep gear-shifting gear 114 and is fitted externally to the input-side transmission shaft 111 such that it can rotate integrally therewith, a fourth creep gear-shifting gear 116 that is disposed in front of the third creep gear-shifting gear 115 and fitted externally to the input-side transmission shaft 11 such that it can rotate integrally therewith, a fifth creep gear-shifting gear 117 that meshes with the fourth creep gear-shifting gear 116, a transmission cylinder 118 that is fitted externally to the output-side transmission shaft 112 such that it can rotate relative to the output-side transmission shaft 12 and to which the fifth creep gear-shifting gear 117 is externally fitted such that it can rotate integrally with the transmission cylinder 118, a creep speed change shifter 119 that is fitted externally to the transmission cylinder 118 such that it can move in the axis direction and can rotate integrally with the transmission cylinder 118, and a sixth creep gear-shifting gear 120 that is disposed at the rear of the second creep gear-shifting gear 114 and that meshes with the input gear 108 and also is fitted externally to the output-side transmission shaft 112 such that it can rotate integrally therewith.

Moreover, a meshing portion 121 that meshes with the creep speed change shifter 119 is provided on the output-side transmission shaft 112 at the rear end side of a movement range in the fore-and-aft direction of the creep speed change shifter 119. In the creep speed change device 43 having the foregoing configuration, when the creep speed change shifter 119 is meshed with the meshing portion 121, the creep speed change device 43 is turned to an on state (creep gear shift state) in which the drive power is transmitted from the counter shaft 45 to the output shaft 46 via the low-speed gear train 102→the output gear 107→the first creep gear-shifting gear 113→the second creep gear-shifting gear 114→the third creep gear-shifting gear 115→the input-side transmission shaft 111→the fourth creep gear-shifting gear 116→the fifth creep gear-shifting gear 117→the transmission cylinder 118→the creep speed change shifter 119→the meshing portion 121→the output-side transmission shaft 112→the sixth creep gear-shifting gear 120→the input gear 108 while being shifted to a very low speed, and when the meshing between the creep speed change shifter 119 and the meshing portion 121 is released, the creep speed change device 43 is turned to an off state in which the drive power is not transmitted from the input-side transmission shaft 111 to the output-side transmission shaft 112.

A sub speed change fork 122 for moving the sub speed change shifter 104 backward and forward and a creep gear shift fork 123 for moving the creep speed change shifter 119 backward and forward are installed on the cover 60. The creep gear shift fork 123 is formed in one piece with the sub speed change fork 122, and the sub speed change fork 122 and the creep gear shift fork 123 can be moved simultaneously in the same direction by a single sub gear shift lever (operating lever). A fourth shift rod 124 is provided between the front and rear support walls 67 and 68 provided on the cover 60 such that it can move in the direction of its axis extending in the fore-and-aft direction. A base portion of the sub speed change fork 122 and the creep gear shift fork 123 is attached to the fourth shift rod 124, and the sub speed change fork 122 and the creep gear shift fork 123 can be moved backward and forward by moving the shift rod 124 in the axis direction, so that the sub speed change shifter 104 and the creep speed change shifter 119 are configured to be moved simultaneously in the same direction.

It should be noted that the sub speed change shifter 104 and the creep speed change shifter 119 may be formed as separate pieces and attached to the same shift rod, thereby allowing the sub speed change shifter 104 and the creep speed change shifter 119 to move integrally with each other. Moreover, the creep speed change shifter 119 is configured such that when the sub speed change shifter 104 is in the high-speed position H and the low-speed position L, it does not mesh with the meshing portion 121, and when the sub speed change shifter 104 is in the creep gear shift position C, it meshes with the meshing portion 121.

Figure 14B:
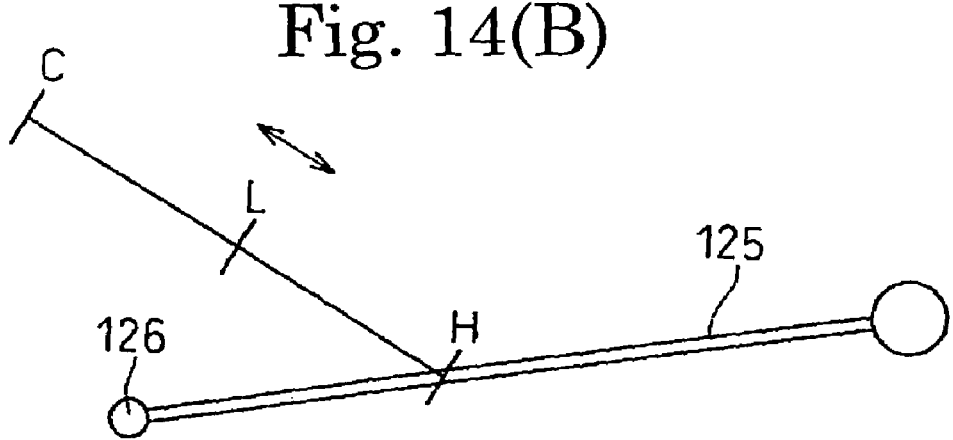
FIG. 14B is a diagram showing a gear shift pattern of the sub speed change device and the creep speed change device.

Therefore, as indicated by an operation pattern shown in FIG. 14B, a configuration is realized in which by operating the single sub gear shift lever 125 to pivot about a pivot portion 126 in a straight line in one direction to switch the sub gear shift lever 125 to the high-speed position H, the low-speed position L, and the creep position C, successive switching to the high-speed state of the sub speed change device 43→the low-speed state of the sub gear shift→the creep gear shift state is achieved. On the other hand, a support portion 129 having an insertion hole 128 having an axis extending in the left-and-right direction and whose ends in the axis direction are opened is provided in a lower rear portion of the cover 60. A rotative shaft 130 is inserted into the insertion hole 128 of the support portion 129, and the rotative shaft 130 is supported such that it can freely rotate about its axis extending in the left-and-right direction.

The rotative shaft 130 is prevented from being disconnected outward in the left-and-right direction by means of an anti-disconnection plate 131 fixed to the outer surface of the support portion 129 with a bolt. The inner end side of the rotative shaft 130 projects from the cover 60 into the clutch housing 1, and an arm member 132 is provided at this inner end side of the rotative shaft 130 so as to project upward and outward in the radial direction. An end (top end) 132a of the arm member 132 engages with an engagement groove 136 formed in the base portion 133 of the sub speed change fork 122 and the creep gear shift fork 123.

Moreover, the outer end side in the left-and-right direction of the rotative shaft 130 projects from the support portion 129. A cylindrical member 134 is fitted externally to this projecting portion and fixed thereto with a pin, and a lever member 135 is provided on the cylindrical member 134 so as to project rearward and outward in the radial direction. The rear end side of the lever member 135 is operatively connected to the sub gear shift lever 125 via an interlocking mechanism. Therefore, a configuration is realized in which when the sub gear shift lever 125 is operated to pivot, the lever member 135 swings up and down, so that the rotative shaft 130 is rotated and also the arm member 132 swings backward and forward, and thus the sub speed change fork 122 and the creep gear shift fork 123 are moved backward and forward via the fourth shift rod 124.

Figure 15:
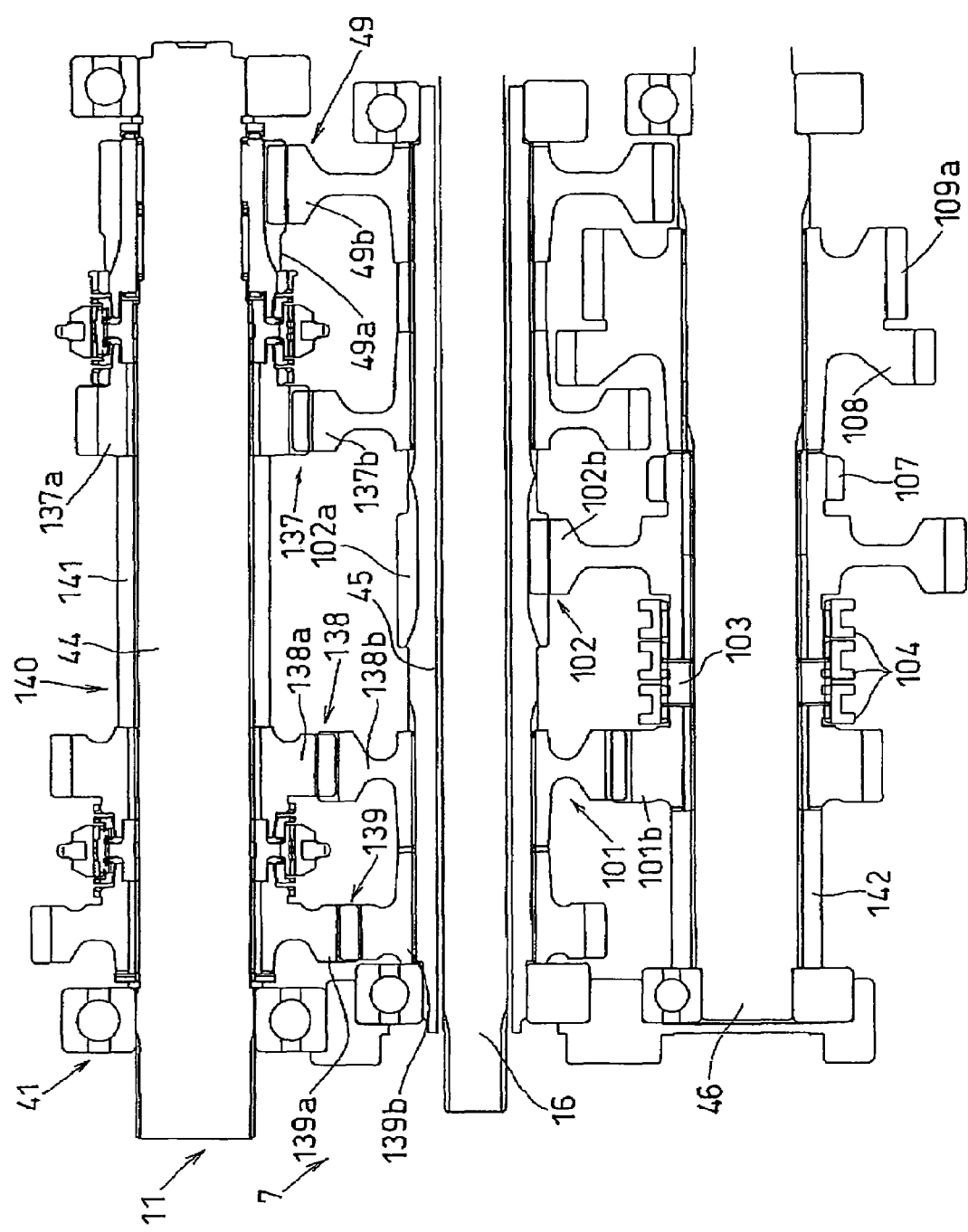
FIG. 15 is a side sectional view showing another embodiment.
Figure 16:
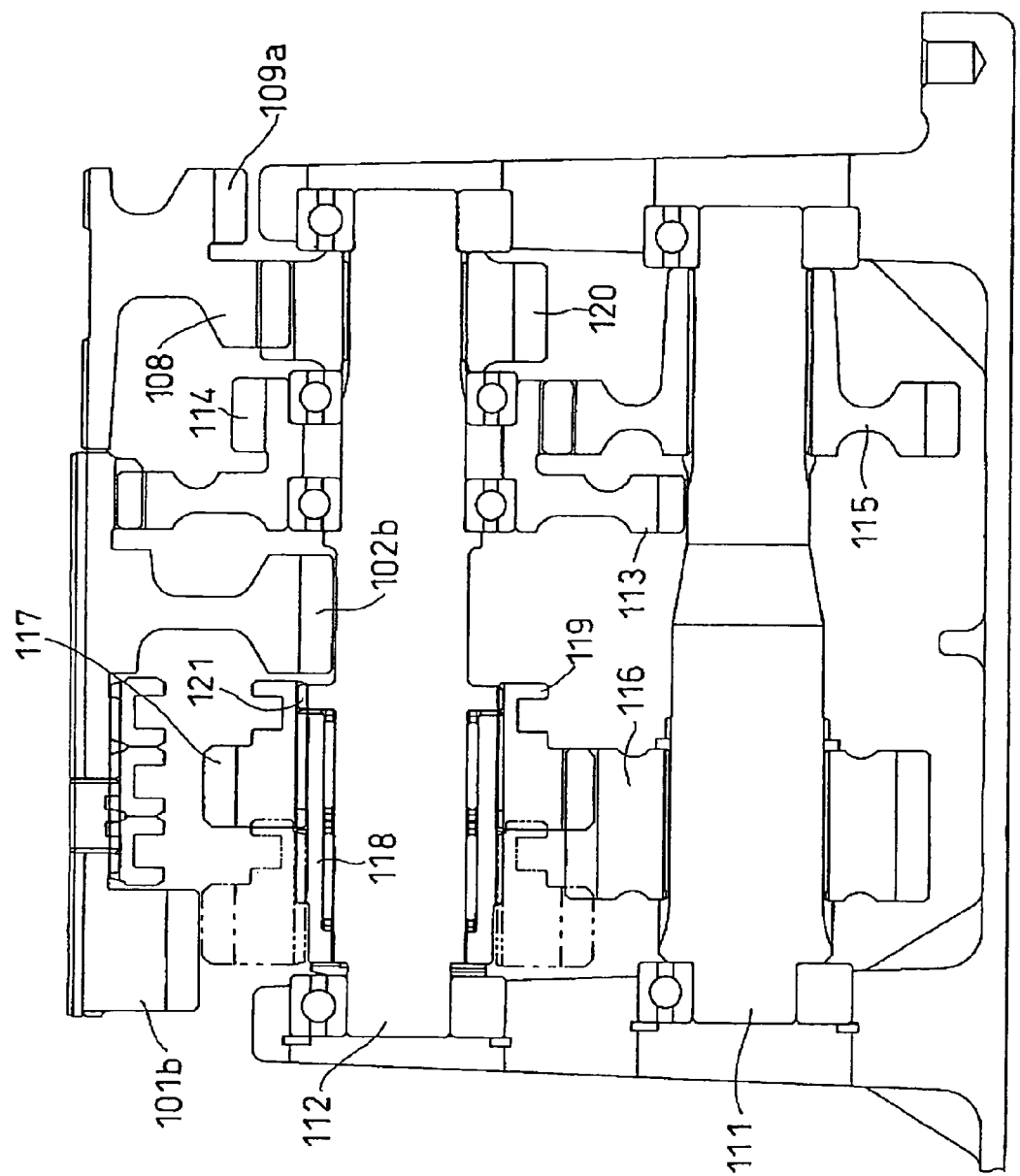
FIG. 16 is a plan sectional view of a creep speed change device according to the another embodiment.

FIGS. 15 and 16, which illustrate another embodiment, show the gear shifting device 11 of the power train 7 in which the main speed change device 41 is adapted to the four-speed, i.e., a first speed to a fourth speed, gear shift specification. In the main speed change device 41 of this gear shifting device 11, a second-speed gear train 137 corresponds to the third-speed gear train 51 in the above-described embodiment in the gear ratio, a third-speed gear train 138 corresponds to the fourth-speed gear train 52 in the above-described embodiment in the gear ratio, a fourth-speed gear train 139 corresponds to the sixth-speed gear train 54 in the above-described embodiment in the gear ratio. Therefore, in this embodiment, the main speed change device 41 has a configuration obtained by removing the second-speed gear train 50 and the fifth-speed gear train 53 and changing the arrangement of the gear trains in the above-described embodiment.

In this embodiment, a space 140 where the fifth-speed gear train 53, the sixth-speed gear train 54, and the third main gear shifting mechanism 57 in the above-described embodiment can be arranged is provided between input-side gears 138a and 139a of the third-speed gear train 138 and the fourth-speed gear train 139, and a spacer 141 is disposed in the space 140 and fitted externally to the input shaft 44 such that it can rotate integrally therewith. Moreover, in this embodiment, since the third-speed gear train 138 corresponds to the fourth-speed gear train 52 in the above-described embodiment, the output-side gear 101b of the high-speed gear train 101 of the sub speed change device 42 in this embodiment is configured to mesh with an output-side gear 138b of the third-speed gear train 138, and a spacer 142 is disposed in a free space in front of the output-side gear 101b of the high-speed gear train 101 and fitted externally to the output shaft 46.

Moreover, the fifth creep gear-shifting gear 117 is formed in one piece with the creep speed change shifter 119 and can be moved in the axis direction on the transmission cylinder 118. Other configurations are almost the same as those in the above-described embodiment shown in FIGS. 1 to 14. Therefore, this embodiment shown in FIGS. 15 and 16 is configured such that a transmission structure in which the main speed change device is adapted to the six-speed gear shift specification as in the above-described embodiment can be obtained by rearranging the gears, for example.

What is claimed is:

1. A transmission for a tractor comprising:
    a transmission case having an opening that is formed in a side wall of the transmission case and that opens to exterior of the transmission case;
    a speed change device that is housed in the transmission case and that transmits driving power from an engine of the tractor to a driven wheel, the speed change device includes:
        a main speed change device capable of changing speed of driving power from the engine to a plurality of speeds;
        a main speed change shifter that causes the main speed change device to change speed;
        a sub speed change device that further changes speed of driving power whose speed was changed by the main speed change device;
        a sub speed change shifter that causes the sub speed change device to change speed;
    a cover removably attached to the transmission case for closing the opening of the transmission, the cover being capable of mounting a creep speed change device having a creep speed position;
    a main speed change shift fork supported by the cover and capable of engaging with and moving the main speed change shifter;
    a sub speed change shift fork supported by the cover and capable of engaging with and moving the sub speed change shifter.

2. A transmission case for a tractor as defined in claim 1, wherein
    the opening and the cover that closes the opening are located on the side wall at a position corresponding to a location of the main speed change shifter in a longitudinal direction of the transmission case.

3. A transmission case for a tractor as defined in claim 1, further comprising:
    the creep speed change device having the creep speed position and removably attached to the cover;

a creep speed change shifter that operates the creep speed change device.

4. A transmission case for a tractor as defined in claim 3, wherein
the creep speed change device is capable of engaging, through the opening, with a portion of a drive train between the sub speed change device and the driven wheel.

5. A transmission case for a tractor as defined in claim 3, further comprising:
a creep speed change shift fork supported by the cover and capable of engaging with and moving the creep speed change shifter.

6. A transmission case for a tractor as defined in claim 5, wherein
the creep speed change shift fork is attached to the sub speed change shift fork to be movable therewith.

7. A transmission case for a tractor as defined in claim 6, further comprising:
an operating lever for operating both the creep change speed shift fork and the sub speed change shift fork wherein simultaneous operation of the creep change speed shift fork and the sub speed change shift fork in the same direction allows a selection of any position among a high speed position of the sub speed change device, a low speed position of the sub speed change device, and the creep speed position.

8. A transmission for a tractor comprising:
a transmission case having an opening that is formed in a side wall of the transmission case and that opens to exterior of the transmission case;
a speed change device that is housed in the transmission case and that transmits driving power from an engine of the tractor to a driven wheel, the speed change device includes:
a main speed change device capable of changing speed of driving power from the engine to a plurality of speeds;
a main speed change shifter that causes the main speed change device to change speed;
a sub speed change device that further changes speed of driving power whose speed was changed by the main speed change device;
a sub speed change shifter that causes the sub speed change device to change speed;
a cover removably attached to the transmission case for closing the opening of the transmission;
a main speed change shift fork supported by the cover and capable of engaging with and moving the main speed change shifter;
a sub speed change shift fork supported by the cover and capable of engaging with and moving the sub speed change shifter;
a creep speed change device having the creep speed position and removably attached to the cover;
a creep speed change shifter that operates the creep speed change device;
a creep speed change shift fork capable of engaging with and moving the creep speed change shifter.

9. A transmission case for a tractor as defined in claim 8, wherein
the opening and the cover that closes the opening are located on the side wall at a position corresponding to a location of the main speed change shifter in a longitudinal direction of the transmission case.

10. A transmission case for a tractor as defined in claim 8, wherein
the creep change speed shift fork is attached to the sub speed change shift fork to be movable therewith.

11. A transmission case for a tractor as defined in claim 10, further comprising:
an operating lever for operating both the creep change speed shift fork and the sub speed change shift fork wherein simultaneous operation of the creep change speed shift fork and the sub speed change shift fork in the same direction allows a selection of any position among a high speed position of the sub speed change device, a low speed position of the sub speed change device, and the creep speed position.

* * * * *